United States Patent
Raat

[11] 3,791,563
[45] Feb. 12, 1974

[54] MOTORCYCLE RACK
[75] Inventor: Terry J. Raat, Seattle, Wash.
[73] Assignee: White Automotive Corporation
[22] Filed: Sept. 15, 1971
[21] Appl. No.: 180,556

[52] U.S. Cl. .............. 224/39 R, 224/30 R, 224/31
[51] Int. Cl. .............................................. B62j 7/04
[58] Field of Search ....... 224/39 R, 41, 31, 9, 25 A; 211/177; 280/202, 289

[56] References Cited
UNITED STATES PATENTS
3,625,405  12/1971  Kezar et al. ..................... 224/32 A
3,318,615  5/1967   Chreist ............................... 280/289

FOREIGN PATENTS OR APPLICATIONS
546,888   8/1956  Italy ..................... 224/32 R
1,087,598 2/1955  France ................. 224/39 R
757,217   9/1956  England ............... 224/39 R
408,991   1924    Germany ............... 224/39

Primary Examiner—Gerald M. Forlenza
Assistant Examiner—Jerold M. Forsberg

[57] ABSTRACT

A rack for use upon a motorcycle or other vehicle including a pair of horizontal mounting arms adapted to be secured to the frame of the motorcycle and extend rearwardly of the seat, and upwardly extending members secured to the arms and supporting a shelf whereby a load may rest upon the shelf and be lashed to the upright members thus providing carrying ability without eliminating the possibility of a second rider.

6 Claims, 5 Drawing Figures

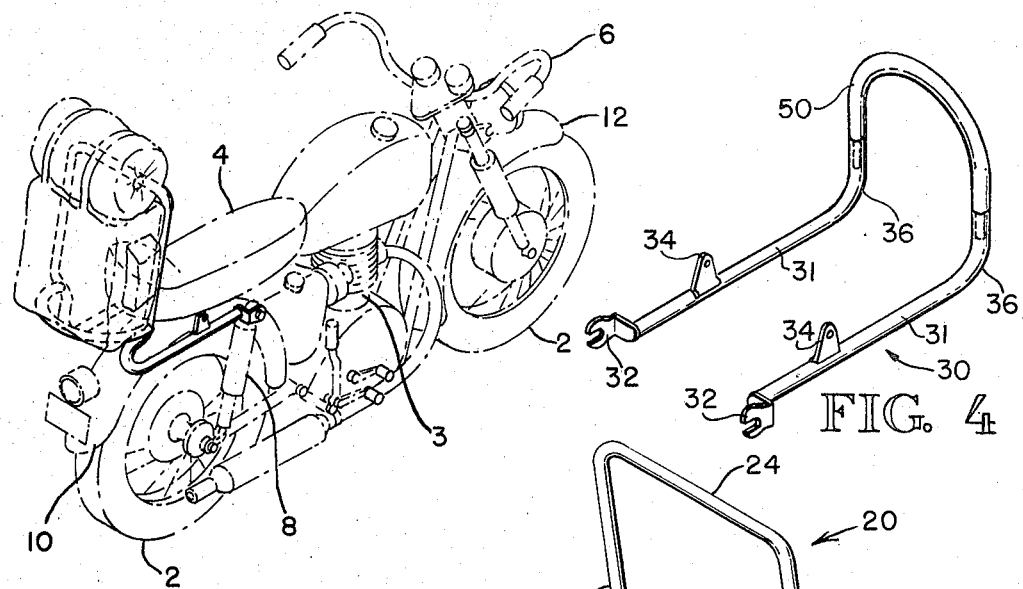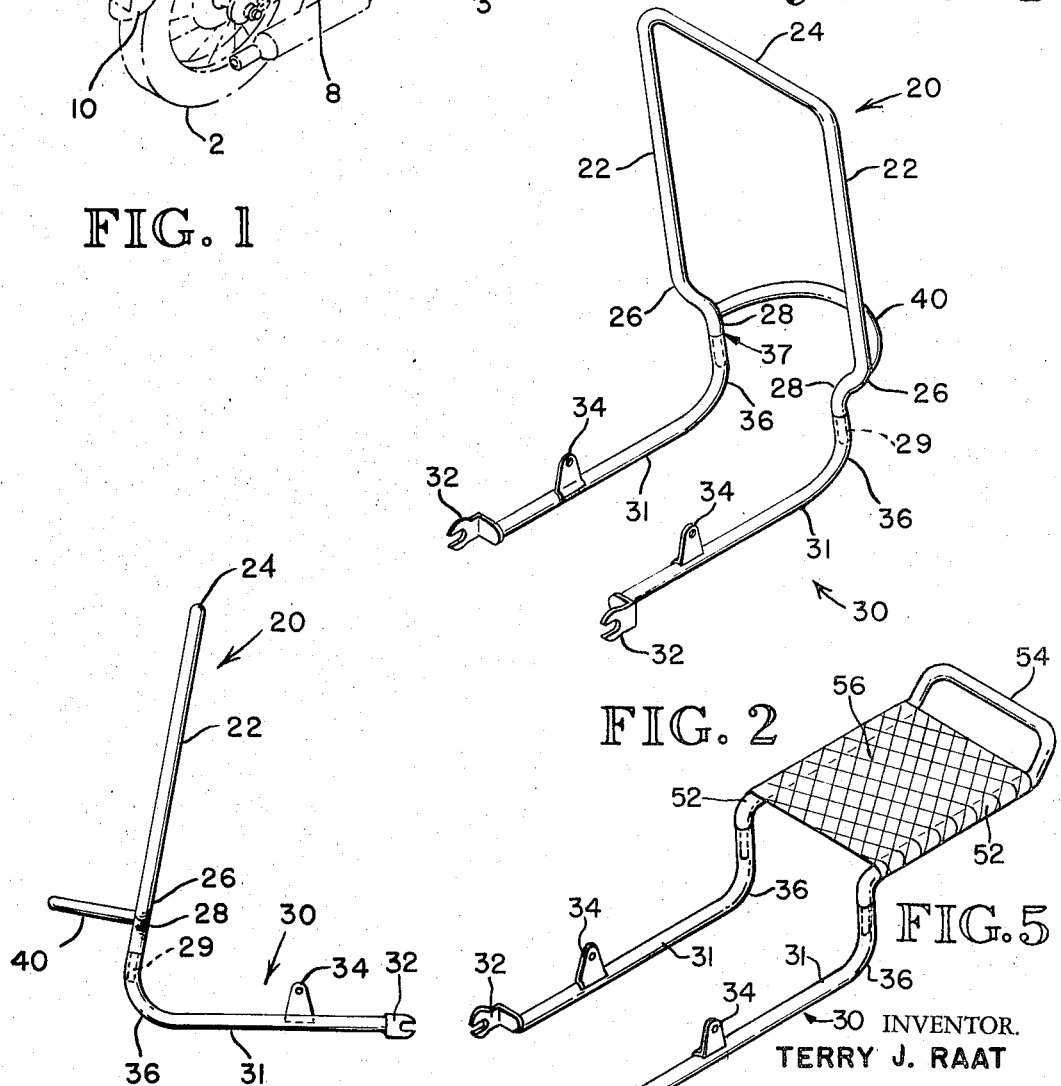

MOTORCYCLE RACK

BACKGROUND OF THE INVENTION

With the increasingly crowded conditions in the cities and the resultant shortage of parking space for vehicles, more and more people have turned to motorcycles as a means of transportation. Motorcycles are economical and convenient transportation and have been acquired for use as company vehicles in some cases and the use of the motorcycle as a general transportation means is becoming more and more acceptable to the general populace.

One of the inherent problems with a motorcycle lies in the fact that because of its particular configuration, shape, and small size it leaves little or no place for a person to transport his possessions safely and efficiently. Attempts have been made to fasten rigid luggage carriers to motorcycles and saddlebag arrangements have also been used in the past.

One of the disadvantages of the rigid type carrying attachment is that it is generally permanently affixed to the vehicle and therefore must be emptied of its contents at the destination or parking area. Another disadvantage is that the rigid carrying attachment is so limited in its use and often times it is unable to meet the immediate needs of the rider. A disadvantage of the saddlebag concept lies in the fact that it limits the motorcycle to only one rider, with the exception of perhaps one brand of motorcycle. Another disadvantage of the use of saddlebags is they hinder maintenance or repair of the rear section of the motorcycle.

Racks have been manufactured for carrying particular items on a motorcycle, such as for example U.S. Pat. No. 3,495,749 granted Feb. 17, 1970, to Meadowcraft which is specifically designed for skis.

Another item which has become extremely popular during the last few years is a rucksack or backpack for carrying objects at times other than when "hiking." Rucksacks have proven to be the most convenient and safest way to carry objects rather than carry objects from one arm or clutched to the chest using one or both arms.

In an attempt to combine the advantages of being able to carry a fairly large quantity of items while riding on a motorcycle as well as providing the ability to readily remove these items when leaving the cycle, it is an object of the invention to provide a rack which is adapted for attachment to the rear portion of the motorcycle and the rack is adapted to secure and support an easily removable pack or rucksack. The rack can also be used by itself to carry larger items.

As can be readily observed, the rack provides a means whereby the motorcycle rider can carry his personal belongings. Further, the rack permits ready attachment of a conventional rucksack or the like so that the rider may remove the entire parcel and carry it efficiently on his person. The brackets and mounting arms which provide support for the rack are readily adaptable to accept racks of other configurations for special purposes.

An object of the present invention is to provide an interchangeable system of rack supports for use upon a motorcycle wherein the mounting elements are securely attached to the vehicle and are adapted to removably receive a variety of elements which adapt the vehicle for carrying a variety of items.

Another object of the present invention is to provide an attachment for use on the back of the motorcycle which may be used for carrying a pack sack which is specifically designed to fit on the rack and alternatively may be used as a universal object carrying device.

Yet another object of the present invention is to provide a rack for a motorcycle which is adapted to carry a pack sack or alternatively as a general carrying means since it includes a generally vertical portion and a generally horizontal portion whereby the objects to be carried may rest upon the horizontal shelf and be secured to the vertical portion.

Still a further object is to provide a means of attaching the rack to a motorcycle wherein a portion of the rack for carrying parcels or the like may be quickly exchanged for an inverted U-shaped touring bar which then may be quickly exchanged for a rearwardly extending rack providing a horizontal platform for trail riding, this latter rack being streamlined to pass easily through dense growth.

BRIEF DESCRIPTION OF THE DRAWINGS

FIG. 1 is an environmental view of the motorcycle having the present rack affixed thereto and showing in phantom a possible bag which could be used for carrying the personal items of the rider of the motorcycle.

FIG. 2 is an isometric view of the rack designed for use with the motorcycle;

FIG. 3 is a side elevational view of the rack made in accordance with the present invention;

FIG. 4 is an isometric view of the second embodiment of the rack;

FIG. 5 is an isometric view of the third embodiment of the rack.

DETAILED DESCRIPTION OF THE DRAWINGS

As seen in FIG. 1 the present rack is designed to be attached to a standard motorcycle having wheels 2 and engine 3, a seat 4 capable of holding either one or two individuals, handlebars 6, shock absorbers 8, and fenders 10 and 12. Referring to the figures it can be seen that the rack is made of tubular materials and comprises a generally vertically disposed and inverted "U" shaped portion 20 having a pair of spaced side rails 22 interconnected by a substantially straight cross-piece 24 serving as the base of the "U." The lower ends of the side rails 22 are bent in a converging direction at 26 to a point 28 at which point the rails are a distance which approximates the distance between arms 31, mounting as explained hereinafter. From the point 28 the rails extend downwardly are generally parallel to plane of the side rails 22.

The lower ends of the side rails of the U-shaped portion 20 are reduced in cross section at 29 so that they will be respectively and telescopically received in the mounting arms 31 having approximately the same cross section as the "U" shaped portion 20.

At approximately the bending point 28 in the hereinabove described rack there is a rearwardly extending, generally horizontal "U" shaped extension or shelf 40. It can thus be seen that the combination of the inverted "U" shaped portion 20 and the shelf 40 act much in the same way as the frame of a conventional backpack and that a rucksack or backpack may easily be attached to the framework and provide adequate support for a relatively large quantity of miscellaneous personal goods.

The mounting or supporting arms generally designated as 30 comprise a pair of spaced, horizontal tubes 31 adapted to be mounted on the rear portion of the motorcycle. The mounting brackets 32 are secured to the forward ends of tubes 31 by a weldment or the like and the mounting bracket 32 are adapted to be secured to the motorcycle shock absorbers. Secured to the upper surface of the mounting arms 31 and spaced slightly from the brackets 32 are brackets 34 in the form of a vertically extending ears which are secured to the framework of the motorcycle below the conventional seat.

The ends of the tubes 31 opposite the brackets 32 are bent at 36 to an angle of approximately 80° or preferably a little greater and terminate in open ends 37. The tubes 31 are adapted to be mounted in a parallel condition with the ends 37 extending upwardly to receive the reduced portions 29 of the side rails.

As can be seen in FIGS. 4 and 5, the mounting arms may be constructed as described above so that they may readily receive other terminal carrying or support means. As seen in FIG. 4, one possible modification is an inverted U 50 which serves as a touring bar and can provide support for a second rider. Referring to FIG. 5, a trail rack is illustrated which has generally horizontal side rails 52 and an upwardly sloping terminal section 54. The side rails 52 are bridged by a supporting webbing 56 which is preferably of metal to provide extra rigidity. It is to be noted that the trail rack is low in profile and narrow in width to lessen interference with brush or the like.

It is to be understood that although the present rack has been described with respect to a motorcycle, it is within the contemplation of the inventive rack that it may well be secured to other types of motor vehicles such as snowmobiles or the like.

The embodiments of the invention in which an exclusive property or privilege is claimed are defined as follows:

1. A carrying device for use upon a motorcycle or other vehicle and adapted to be secured to the rear portion of said vehicle comprising the combination;
   a pair of spaced, generally horizontal mounting members adapted to be secured to the framework, one on each side of the vehicle and extending rearwardly to a point behind the driver's seat, and then curved upwardly, each member terminating in one-half of a male-female interconnection,
   a load supporting element having a pair of spaced end portions mating with the male-female interconnection of the horizontal mounting members and extending upwardly, including a pair of side rails which are interconnected at their upper end by a generally horizontal linking member presenting a smooth upper surface and a generally U-shaped shelf member extending rearwardly from and bridging the distance between the side rails whereby articles to be carried may be positioned on said shelf member and lashed to the side rails of the load supporting element, and thus be secure without interfering with the normal operation of the vehicle.

2. A carrying device as in claim 1 wherein the mounting members, supporting element and shelf are constructed of tubular material.

3. A carrying device as in claim 1 wherein the load supporting element is detachable from the mounting members.

4. A carrying device as in claim 1 wherein the load supporting element is of the general shape of a pack frame and is adapted to be received in the pocket of a pack bag.

5. A carrying device as in claim 1 wherein the mounting members include integral fastening elements for interconnection with the shock absorber mounting means.

6. A carrying device for use upon a motorcycle or other vehicle and adapted to be secured to the rear portion of said vehicle comprising the combination;
   a pair of spaced, generally horizontal mounting members adapted to be secured to the framework, one on each side of the vehicle and extending rearwardly to a point behind the driver's seat, and then curved upwardly, each member terminating in one-half of a male-female interconnection,
   a load supporting element having a pair of spaced end portions mating with the male-female interconnection of the horizontal mounting members and extending coaxially therewith, said male-female interconnection being readily disconnected, said load supporting element including a generally U-shaped portion extending in a direction substantially perpendicular to the axis of said male-female interconnection, webbing bridging the legs of said U-shaped portion, said webbing being positioned on said U-shaped portion between said male-female interconnection and the bight of the U-shaped portion whereby articles to be carried may be positioned thereon.

* * * * *